United States Patent
Martin (10) Patent No.: US 8,919,387 B2
(45) Date of Patent: Dec. 30, 2014

(54) HIGH STRENGTH THREAD FOR TUBULAR COMPOSITES

(75) Inventor: Tracy Michael Martin, Spring, TX (US)

(73) Assignee: General Plastics & Composites, L.P., Houston, TX (US)

( * ) Notice: Subject to any disclaimer, the term of this patent is extended or adjusted under 35 U.S.C. 154(b) by 1260 days.

(21) Appl. No.: 12/748,152

(22) Filed: Mar. 26, 2010

(65) Prior Publication Data

US 2011/0132486 A1    Jun. 9, 2011

Related U.S. Application Data

(60) Provisional application No. 61/267,157, filed on Dec. 7, 2009.

(51) Int. Cl.
| | |
|---|---|
| *F16L 9/12* | (2006.01) |
| *F16L 15/06* | (2006.01) |
| *E21B 17/042* | (2006.01) |
| *F16L 9/16* | (2006.01) |

(52) U.S. Cl.
CPC ............... *F16L 15/06* (2013.01); *E21B 17/042* (2013.01); *F16L 9/16* (2013.01)
USPC ........... 138/109; 138/134; 138/153; 285/333; 403/118; 403/109.4; 403/156

(58) Field of Classification Search
CPC ............. F16L 9/128; F16L 9/12; F16L 15/06; F16L 15/001
USPC ........... 138/109, 134, 153; 285/333; 403/118, 403/109.4, 156
See application file for complete search history.

(56) References Cited

U.S. PATENT DOCUMENTS

| | | | | |
|---|---|---|---|---|
| 3,586,353 A | * | 6/1971 | Lorenz et al. | 285/334 |
| 4,214,932 A | * | 7/1980 | Van Auken | 156/187 |
| 4,243,075 A | * | 1/1981 | McPherson et al. | 138/174 |
| 4,649,960 A | * | 3/1987 | Policelli | 138/109 |
| 4,893,658 A | * | 1/1990 | Kimura et al. | 138/109 |
| 5,351,752 A | * | 10/1994 | Wood et al. | 166/68 |
| 5,516,158 A | * | 5/1996 | Watts | 285/333 |
| 5,785,092 A | * | 7/1998 | Friedrich et al. | 138/133 |
| 5,988,300 A | * | 11/1999 | Pomerleau et al. | 175/320 |
| 6,016,848 A | * | 1/2000 | Egres, Jr. | 138/137 |
| 6,047,997 A | * | 4/2000 | Olivier | 285/333 |
| 6,050,612 A | * | 4/2000 | Wolterman | 285/259 |
| 6,240,971 B1 | * | 6/2001 | Monette et al. | 138/153 |
| 6,581,644 B1 | * | 6/2003 | Monette et al. | 138/174 |

(Continued)

*Primary Examiner* — James Hook
(74) *Attorney, Agent, or Firm* — Timothy S. Westby; Porter Hedges LLP (57) ABSTRACT

Herein disclosed is a mechanism for providing high load capabilities in downhole locations. The mechanism comprises tubulars, at least one of which is constructed from composite; and the tubular composite being for high load capabilities in connecting the tubulars. In some cases, there are at least two tubulars in the mechanism. In some cases, the mechanism comprises a thread form, which thread form is mounted to translate an axially directed force into a radially directed force. In some cases, the high load capabilities include a load bearing flank angle of 15° to 50° as measured from the axis of said tubular. In some cases, the high load capabilities include a clearance flank angle of 15° or less as measured perpendicular to the axis of said tubular. In some cases, at least one of the tubulars includes a thread pitch, having from 2 to 12 threads per inch.

25 Claims, 8 Drawing Sheets

(56) References Cited

U.S. PATENT DOCUMENTS

| | | | |
|---|---|---|---|
| 7,513,537 B2* | 4/2009 | Mosing et al. | 285/401 |
| 2004/0021314 A1* | 2/2004 | Pina et al. | 285/94 |
| 2010/0018699 A1* | 1/2010 | Hall et al. | 166/242.6 |
| 2010/0171306 A1* | 7/2010 | Gillot et al. | 285/334 |
| 2010/0230959 A1* | 9/2010 | Watts | 285/333 |

* cited by examiner

HIGH STRENGTH THREAD FOR TUBULAR COMPOSITES

CROSS-REFERENCE TO RELATED APPLICATIONS

This application claims the benefit of U.S. Provisional Application No. 61/267,157 filed on Dec. 14, 2009 entitled "High Strength Thread for Tubular Composites," which is incorporated herein by reference for all purposes.

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

Tools for oil and gas wellbore made from tubular composites have a need for a high strength thread form. Specifically, high strength threads are needed for tooling connections and for electrical isolation.

In general composite construction, there are limited methods for assembling multiple components. The primary method is to bond parts together using an adhesive. In applications requiring greater strength, mechanical reinforcement may be provided using dowel pins or bolts. In the special case of tubular composites, threading may be used. However, typical thread forms used on tubular composites are generally not well suited for high load applications. The construction of the tubular composite is a limiting factor in the connector strength.

A tubular composite is made up of a reinforcing material and a resin. The reinforcing material can be any of a large number of materials commonly used in composite manufacture. Glass is a common reinforcement and is available in woven cloths, filaments (yarn), and tape forms. Additionally, woven cloths, filaments, and tape forms each have a large number of configurations available. For oil and gas wellbore applications, epoxy resins are commonly used for the elevated temperature and pressure requirements. Generally, epoxy resins have good chemical resistance required in this application.

Figures 1A, 1B:
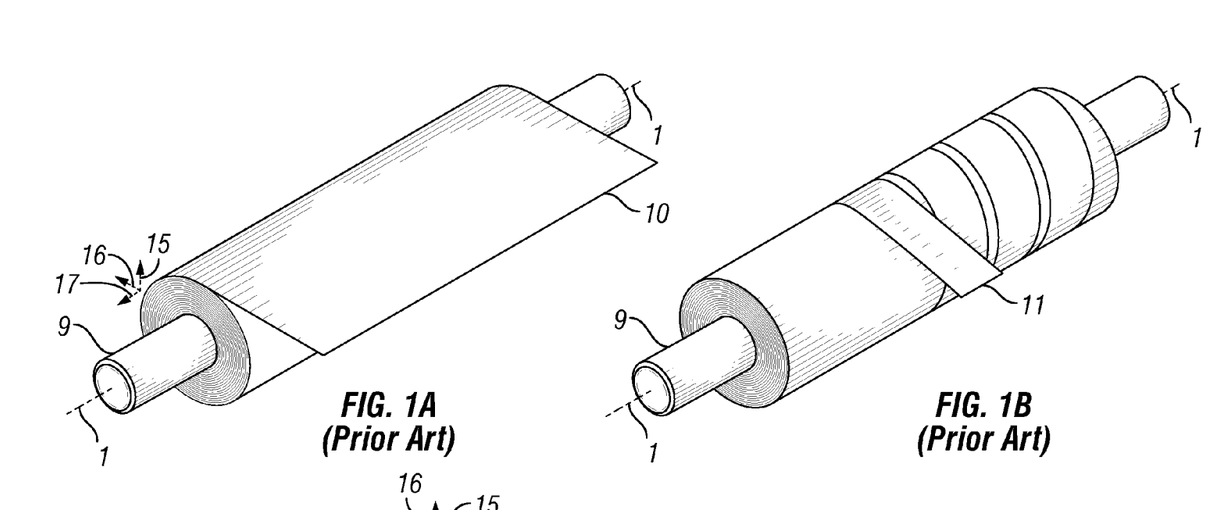
FIG. 1A: Cloth Wrapped Tubular Composite Material Lay-up, Isotropic View.
FIG. 1B: Filament/Tape Wound Tubular Composite Material Lay-up, Isotropic View.

FIG. 1A illustrates the construction of tubular composite as commonly used in oil and gas wellbore tools. The tubular composite may be constructed by wrapping a reinforcing cloth 10 around a tooling mandrel 9 with the addition of a resin 14 either during (wet wrapping) or after (resin transfer molding) wrapping. Alternatively as shown in FIG. 1B, a tubular composite may be constructed by the process of filament/tape winding, wherein reinforcing filaments 11 are wound around the tooling mandrel 9 with the addition of the resin 14. The latter method is commonly used by the manufacturers of fiberglass tubing.

Once combined in a tubular form, the material is subjected to heat to harden the resin system. This hardening is known as "curing". Curing requirements are determined by the resin used. The composite material may be post-cured for improved properties.

Figure 1C:
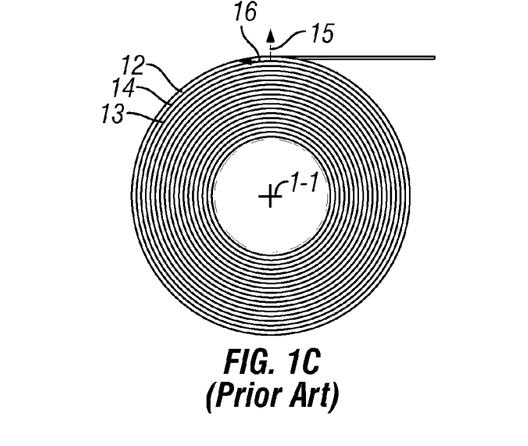
FIG. 1C: Tubular Composite Laminate Detail, End View of Section taken Perpendicular to Axis 1-1.
Figure 1D:
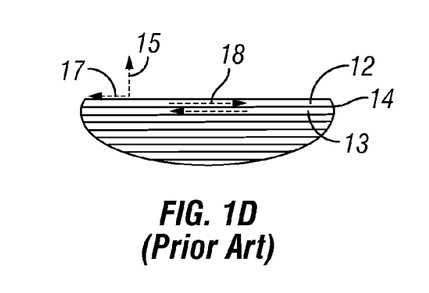
FIG. 1D: Material Loading and Interlaminar Shear, Section View taken along Axis 1-1.

Material produced in this manner is referred to as a laminate 12,13,14 within the industry. A laminate has layers of reinforcing material 12 and 13 with a resin bonding layer 14 between them as shown in FIG. 1C and FIG. 1D [check Section 1-1]. The area between any two layers is referred to as an interlaminar area.

The material properties of laminates 12,13 are typically anisotropic. An anisotropic material is one with properties that vary based upon the load orientation. Referring to FIGS. 1C and 1D, the material properties in tubular composites are oriented in radial 15, circumferential 16, and axial 17 directions. Metals are classified as an isotropic material. An isotropic material is one where the material properties are the same regardless of the load orientation. Common thread forms have been designed based upon the assumption that the materials used are isotropic.

In the prior art, the thread forms were not modified to account for an anisotropic material properties when manufactured in laminate.

As the properties of laminates differ in each direction, the load condition will determine the performance. In FIG. 1D, when a load is applied to the laminate 12,13,14 in an axial direction 17 such that two adjacent layers 12,13 are subject to opposing loads 18,19 where the load 19 condition is termed an interlaminar shear. The interlaminar shear occurs in the resin 14 that bonds the two layers together. This strength of the material in this interlaminar area is significantly less than the strength in other directions. In a tubular composite, the interlaminar shear condition occurs in a direction 17 along the axis of the tube formed by the cross-section 1-1 of FIG. 1. A thread form machined into such a tubular composite will be subjected to this interlaminar shear.

Figure 2:
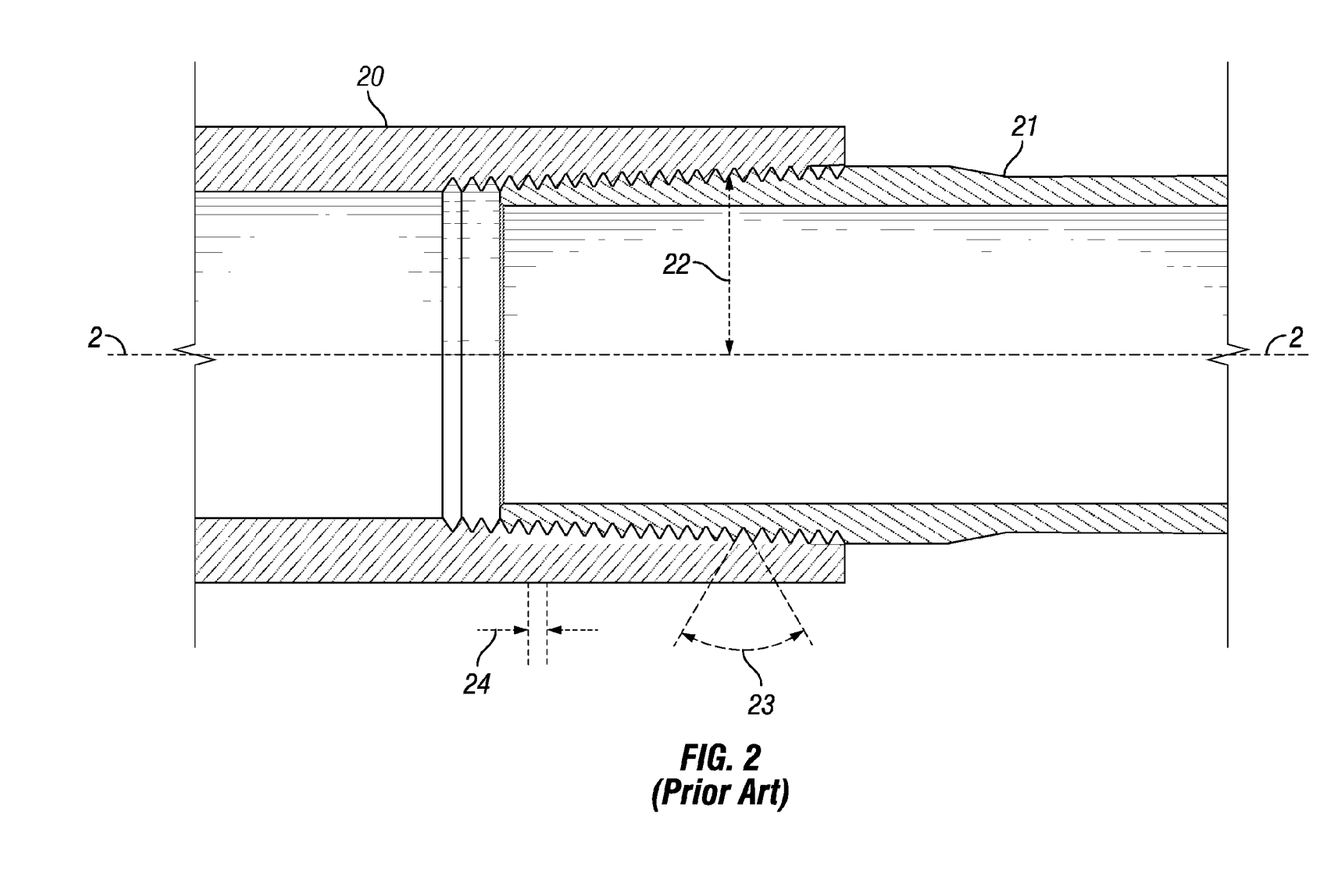
FIG. 2: American Petroleum institute External Upset 8 Round Thread, Section View taken along Tubular Axis 2-2.

In the manufacture of metallic components for oil and gas wellbore applications, there are many thread types available based upon the application. Thread manufacture in tubular composites has borrowed thread forms from the metallic threads. For oil and gas wellbore, a thread form that is used for tubular materials is the American Petroleum Institute (API) External Upset 8 Round Thread (API EUE 8RD). The details of this thread may be found in the API specification 5B, "Specification for Threading, Gauging and Thread Inspection of Casing, Tubing, and Line Pipe Threads". The API EUE 8RD has primarily been borrowed for use in fiberglass tubing, a tubular composite material with thin wall sections. FIG. 2 illustrates a typical Box 20 and Pin 21 configuration for the API EUE 8RD thread as used in common tubular both metallic and non-metallic. The API EUE 8RD thread form allows for a moderate pressure seal, but was not intended to carry the high loads that are required in the tooling applications for which the new thread is intended.

Figure 3:
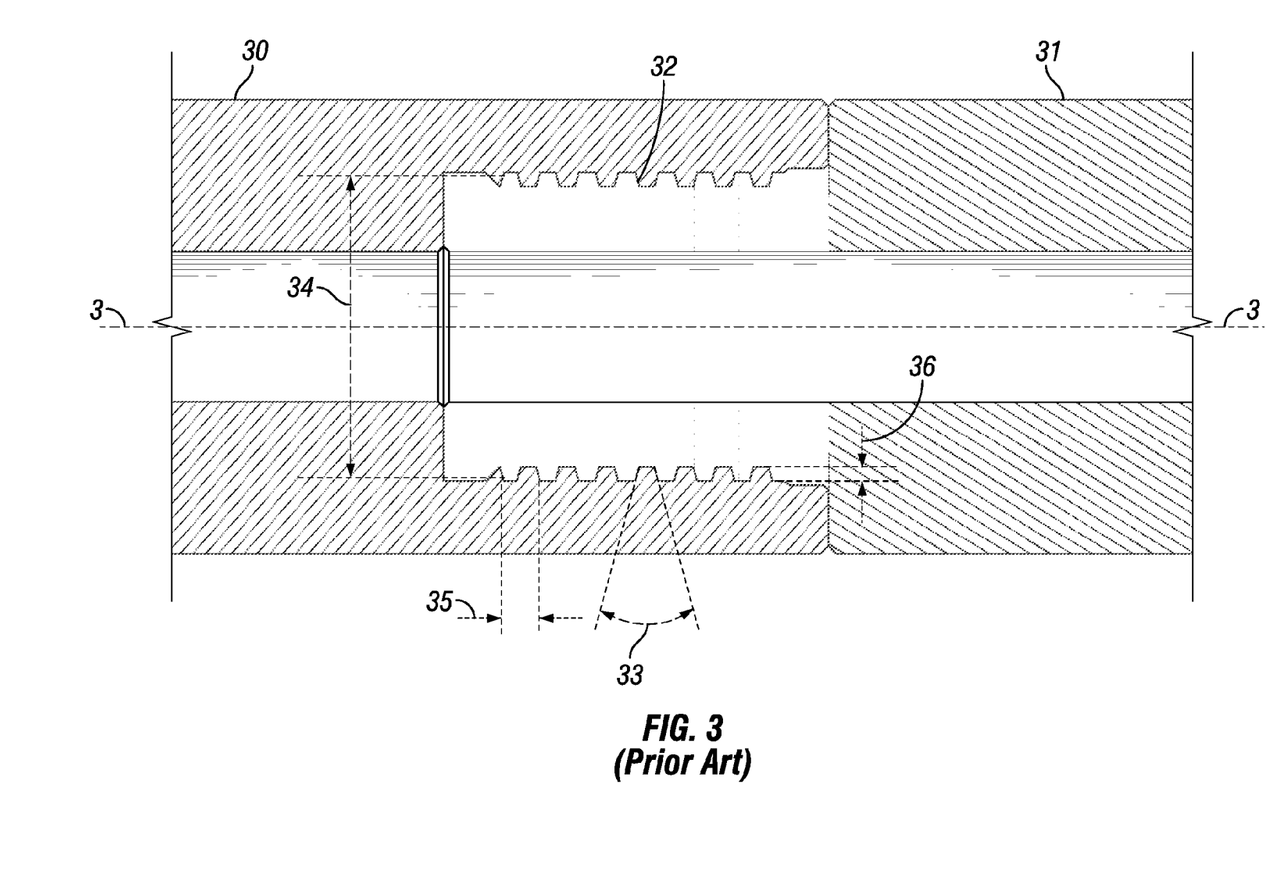
FIG. 3: American National Acme Thread, Section View taken along Tubular Axis 3-3.

For oil and gas wellbore tooling applications, there are other threads that offer greater strength. Among such connections, the most common threads used are the American National Standard Acme Screw Threads (Acme) as specified in ANSI B1.5-1988 (R2001), shown in FIG. 3. If a shallower thread is required, ANSI B1.5-1988 (R2001) specifies a related thread form known as the American National Standard Stub Acme Screw Threads (Stub Acme). The Acme and Stub Acme thread share a common thread angle 33 (for second thread angle where in FIG. 3), but vary in thread height 36. All dimensions for these thread can be determined for both the internal (box) 30 and external (pin) 31 threads based upon the major diameter 34 of the external thread and the thread pitch 35. As with other thread forms, the Acme and Stub Acme thread forms were designed for metallic tubular.

Figure 4:
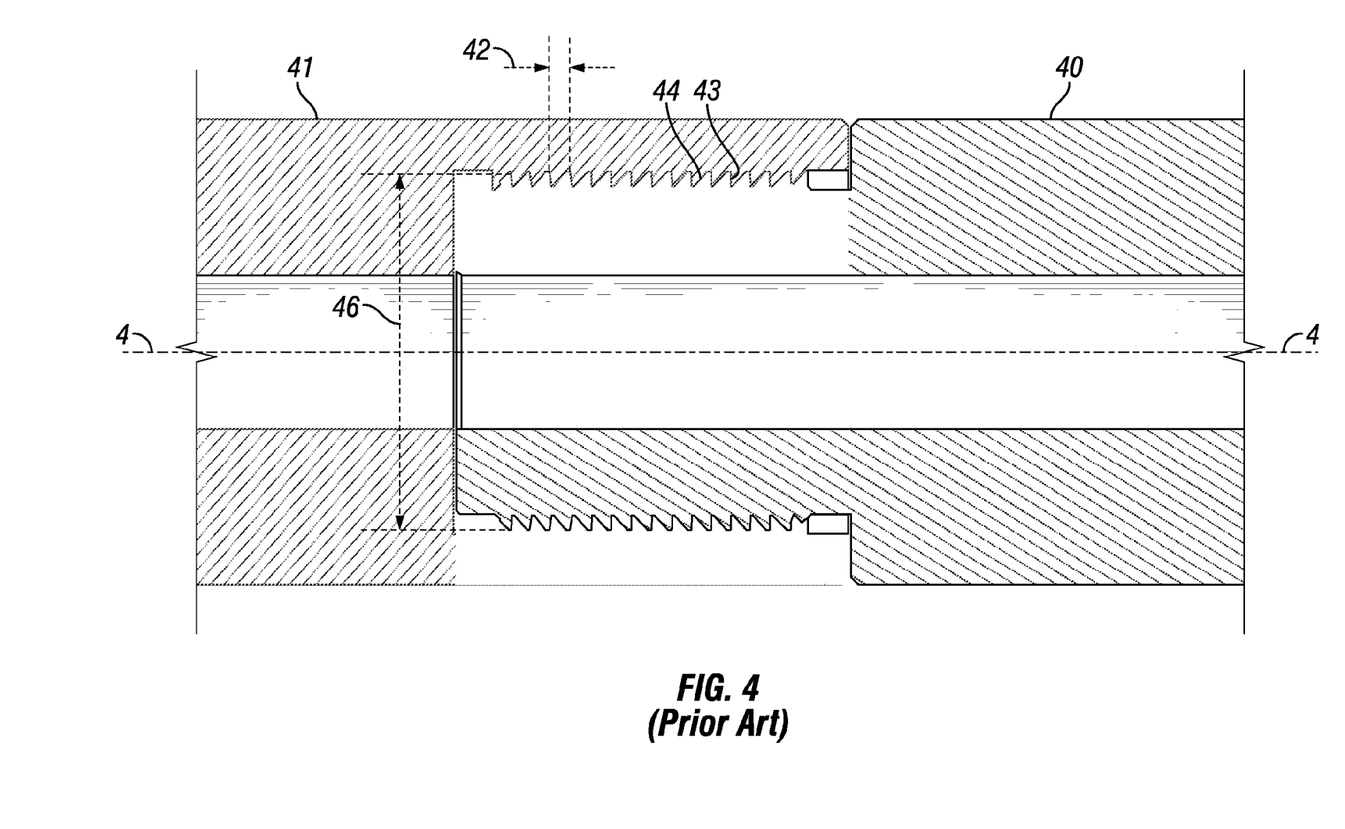
FIG. 4: American National Standard Buttress Thread, Section View taken along Tubular Axis 4-4.

A thread form used in some applications where high strength is required in metallic-tubular connections is the American National Standard Inch Buttress Screw Thread (Buttress) as specified in ANSI B1.9-1973 (R1992). As indicated in FIG. 4, the Buttress thread has a load bearing flank 43 that is nearly perpendicular to the tubular axis 4-4. As with the Acme and Stub Acme threads, most dimensions may be calculated from the major diameter 46 of the pin thread 41 and the thread pitch 42.

All of the threads above have been designed for metallic connections. The isotropic properties of metals allow for such variation in thread designs. When applied to tubular composites, the anisotropic properties yield poor performance. The common failure for threads manufactured in tubular composites is a shear failure of the threads. The shear failure of the threads is an interlaminar shear which typically occurs at the root of the thread. The interlaminar shear strength of the tubular composite is significantly weaker than the strength in other directions. To carry the high loads required in many oil and gas wellbore applications, it becomes necessary to have a thread engagement that is far in excess of what is easily manufacturable.

SUMMARY OF THE INVENTION

As set out below, the thread form is designed to alleviate the interlaminar shear limitations and increase the strength of a threaded tubular composite connection by reducing interlaminar stresses. The thread form has a load bearing flank angle smaller than existing thread forms as measured from the tubular axis. The decreased angle translates a load applied to the threaded components, parallel to the tubular axis, into an orientation that applies greater stresses in a radial direction and decreases the stresses in the axial direction of the interlaminar area. As the strength of the material tubular composite material is weakest in this interlaminar area, the shear stress in the interlaminar area determines the failure load on the thread.

The thread may be used with composite-to-composite and metal-to-composite connections. The connection requires an elastomeric seal to hold differential pressure.

BRIEF DESCRIPTION OF THE DRAWINGS

For a further understanding of the nature and objects of the present invention reference should be made to the specification and claims made a part hereof, where like parts are given like reference numerals and wherein:

FIG. 7-A: "Thread Form Load Comparison, Section View taken along Tubular Axis 8-8;

FIG. 7-B: Thread Form Load Comparison, Section View taken along Tubular Axis 8-9:

DETAILED DESCRIPTION OF PREFERRED EMBODIMENT

Figure 5A:
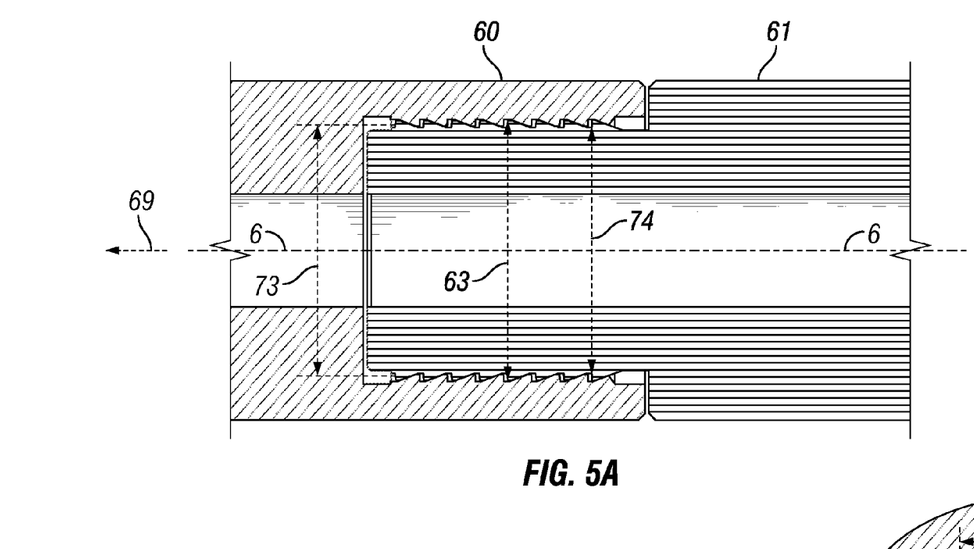
FIG. 5A: High Strength Composite Thread, Section View taken along Tubular Axis 69-69.

The present invention addresses common thread forms used in metallic threads that do not offer the necessary strengths required in oil and gas wellbore use when applied to tubular composites. These threads do not have shown the differences between isotropic metallic materials and the anisotropic tubular composites. These differences are directly responsible for the poorer performance of the metallic threads used in tubular composites. Referring to FIG. 5A, a threaded connection 61 is shown for a tubular composite used in an oil and gas wellbore application. The threaded connection is comprised of a box 60 with internal threading 63 and pin 61 with external threading 74.

The threaded connection 61 as shown is subjected to a tensile load 69 along the axis 6-6 of the tubular composite. The material of the composite is of a laminate form 12, 13 with layers 14 formed radially around the axis, such as 6-6, of the tubular composite. The threaded connection may carry a load as much as twice as high as thread forms that were originally designed for isotropic materials.

Figure 5B:
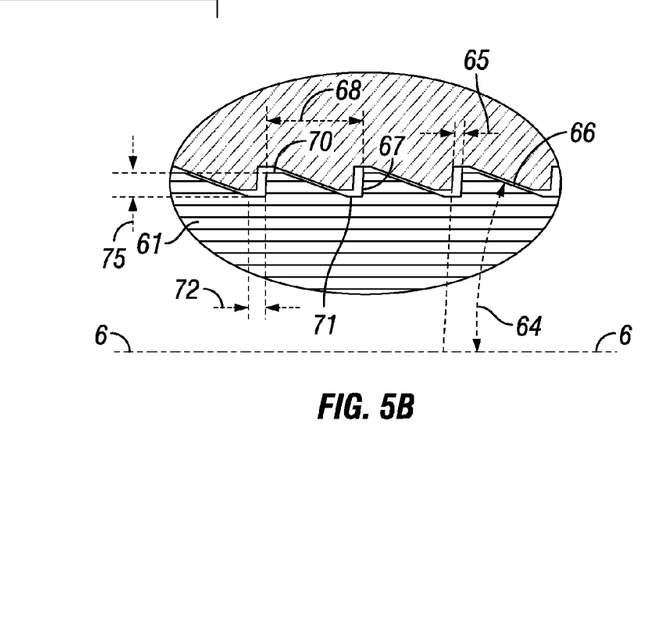
FIG. 5B: Thread Form, Detail View as Taken from FIG. 5A.

The pin 61 is used as the basis for all calculated dimensions for the thread form, with the thread size defined by the major diameter of the external thread 74. The major diameter 63 of the thread may be any diameter as required to fit the overall tool geometry. Referring to FIG. 5B, the load bearing flank 66 has an angle 64 which any vary from an angle of 15° to 50° as measured from the axis of the tubular composite 6-6. The load bearing flank angle 64 is generally shallower than the flank bearing angles commonly used in metallic threads forms. For these metallic thread forms, a more typical angle would be 60°-90° as measured from the axis of the tubular, as there is no interlaminar shear area. The thread form is not symmetric, having a clearance flank 67 with an angle 65 that is not equal to the load bearing flank angle 64. The clearance flank angle 65 may be any angle from 0 to 15° as measured perpendicular to the axis of the tubular composite 6-6. As the angle of the clearance flank 67 nearly perpendicular to the thread is designed to carry the highest loads in a single direction. The thread will be oriented such that the load bearing flank 66 as described will be loaded under the highest load conditions.

Figure 6:
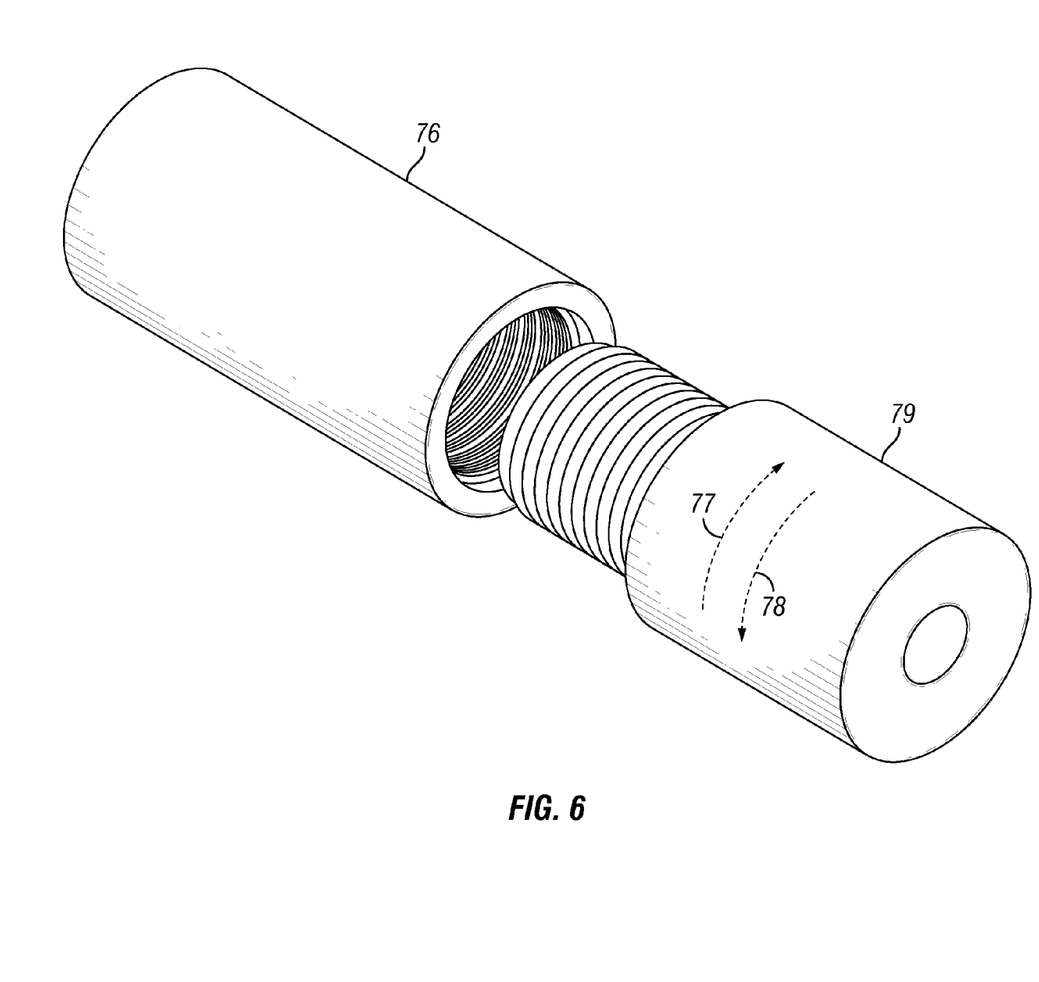
FIG. 6: Threaded connection make-up, Isometric View.

Referring to FIG. 5B, the thread pitch 68 may be a value from 2 to 12 threads per inch. The thread pitch 68 in combination with the load bearing flank angle 64 and clearance flank angle 65 will directly affect the thread height 75. The thread crest 70 and thread root 71 may be flat or radiused as shown in FIG. 5B. Thread root 71 should be of a length 72 sufficient to accommodate the crest 70 of the mating thread. The thread dimensions, tolerances, and allowances for the major 63, minor 74, and pitch 73 diameters may be calculated based upon the Class 2 specifications for the American National Standard Buttress Inch Screw Threads (ANSI B1.9-1973 (R1992)). The thread can be manufactured in either a right-handed or left-handed configuration as required. As shown in FIG. 6, a right handed configuration is one where the pin 79 is threaded into the box 76 in a clockwise direction 77. A left-handed configuration is threaded counterclockwise 78.

Figure 7A:
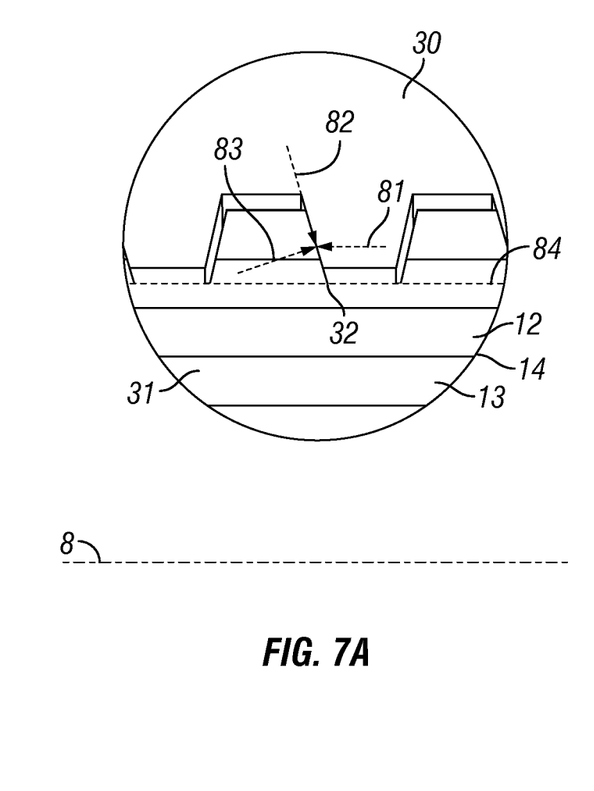
Figure 7B:
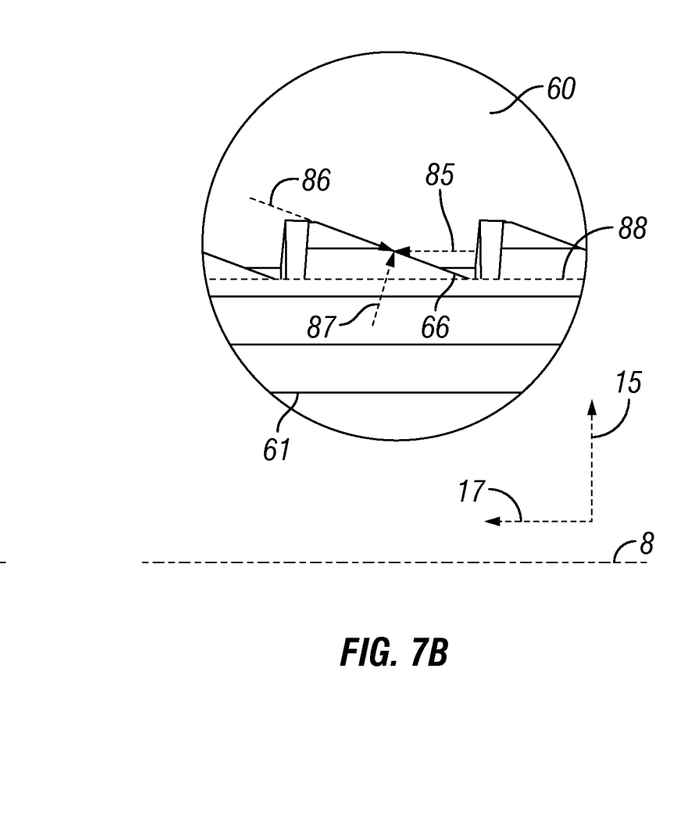

An explanation of the performance of the high load tubular composite thread form in comparison to a common metallic thread form, a Stub Acme, is shown in FIGS. 7-A and 7-B. For the Stub Acme thread 30,31, a load applied to either the box 30 or pin 31 in an axial direction 17, will create an axial load 81 against the load bearing flank 32 of the thread. This axial load 81 parallels the tubular composite layers 12, 13, 14. Metallic components, upon which the thread form is based, lack the interlaminar shear layers found in tubular composites. The interlaminar shear strength is determined by the properties of the resin, and is by far the weakest of the material properties for a laminate. When a common metallic thread form is applied to the tubular composite, the shear in the interlaminar layer 84 will occur at values that are a very small fraction of a similar metallic thread. This interlaminar shear area is at the root of the thread. The high load thread 60,61 described, will see the same load behavior, with the axial-load 85 loaded at the load bearing flank 66. As with other thread forms, the high load thread will shear along the interlaminar shear area 88 at the root of the external thread 61.

Still in reference to FIGS. 7-A and 7-B, if the tubular composite used for the common thread 30,31 and the high load thread 60,61 is otherwise identical, then interlaminar shear strength along the interlaminar shear layers 85 and 88 may be expected to be identical. However, the high load thread may successfully support loads in an axial direction 17 as in an axial direction 17 as much as twice the load capability of the Stub Acme thread. The orientation of the resultant forces explains this result. In a Stub Acme thread, the load applied parallel to the tubular axis 81 causes a resultant normal 83 force and a resultant friction force 82. The normal force 83 of a Stub Acme thread continues to be oriented largely in an axial direction 17. This will result in a majority of the load being imparted along the interlaminar shear area 84. In comparison, a load 85 applied to the high load thread will produce a normal force 87 oriented more closely to the radial direction 15 of the laminate. Under this load condition, the stresses along the interlaminar shear area 88 are reduced. With an equal load applied two each thread. the Acme, Stub Acme, and API EUE 8RD threads will subject the interlaminar shear area to much higher stresses in the axial direction 17 than the high load tubular composite threads.

The thread form described is primarily intended for the connection of one tubular composite to another, a composite-to-composite connection, the threaded connection benefits such a connection due to the inherent weakness of the interlaminar shear area that exists in tubular composites. However, there is no similar benefit to be had by manufacturing this thread form in an isotropic material such as metals. The shallow load bearing flank angle 64, as shown in FIG. 5B, might even have a detrimental effect when applied to a metallic thread. This detrimental effect can occur when the radial loads are sufficient to cause a separation of the threads such that a metal-to-metal connection is no longer engaged. However, the thread form may be manufactured in metal for connection to a tubular composite. In such a metal-to-composite connection, the interlaminar shear strength is still significantly less than the loads required for the threads to separate. An application where such a connection might be required, is in electrically isolating connections used in oil and gas wellbore logging equipment. A non-conductive tubular composite is ideal in such an application; however, the loads required may be in excess of 120,000 lbf, making a threaded connection with the existing metallic threads forms impractical.

A threaded tubular composite connection is required for high load applications in oil and gas wellbore applications. A tubular composite produced such that the material forms laminate layers radiating from tubular ID. While a thread machined from a tubular will fail under load in the area between laminate layers, an area called the interlaminar area, the strength of a composite material in this layer is much less than the materials strengths in other directions. Common thread forms known in the art, and design for metallic connections, are unable to carry the loads required when applied to the tubular composite materials.

When an application requires even greater load, an adhesive may be applied to the threads. The adhesive will benefit the connection in two ways. First, it creates a secondary bond that further reduces the interlaminar shear stresses on the connection. Second, the adhesive will fill void spaces in the thread ensuring that all threads are in contact when the thread is loaded. The adhesive should be applied to the external (pin) thread prior to assembly. Alternatively, a low viscosity resin or adhesive may be injected into an assembled threaded connection.

Figure 8:
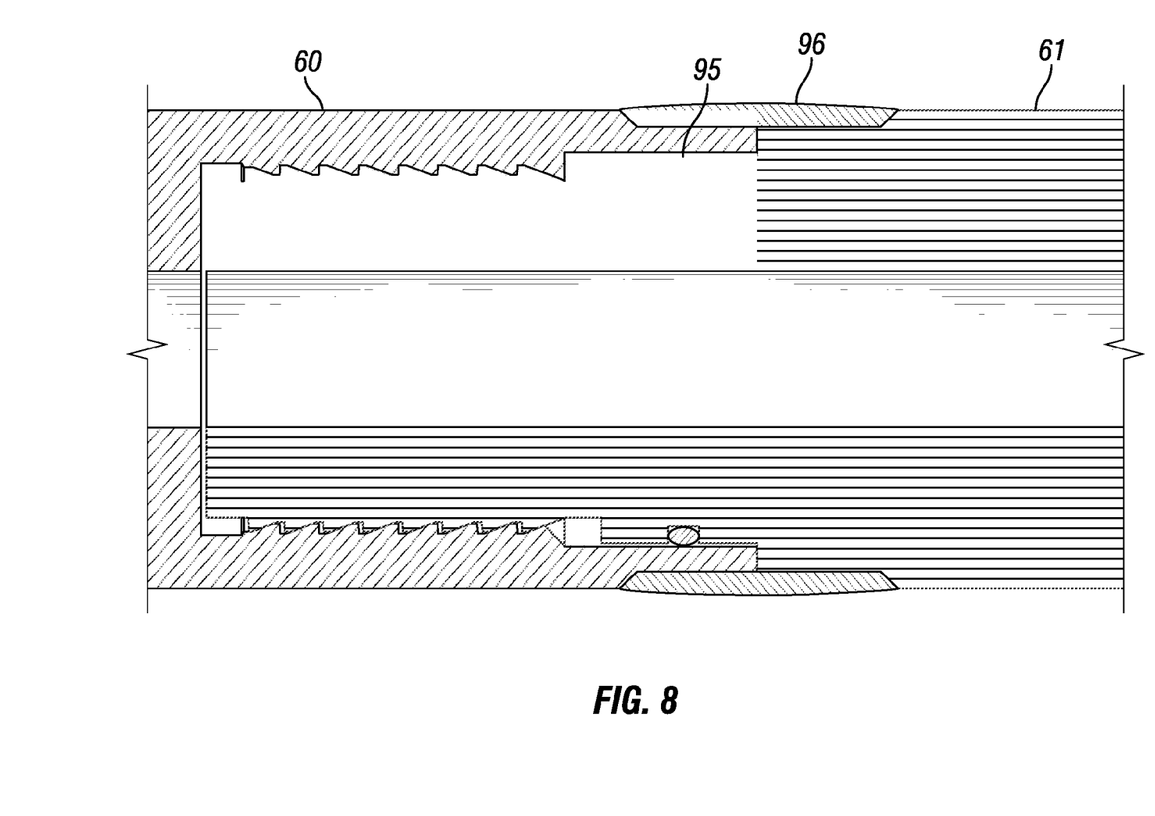
FIG. 8: Sealing Mechanisms, Section View taken along Tubular Axis 9-9

Like the common tool threads, such as Acme or Stub Acme, the high load thread is not intended to maintain a pressure differential. Referring to FIG. 8, to hold pressure differentials across the threaded connection, a sealing mechanism will be required. The seal may be of either a common o-ring type 95 or a bonded elastomeric seal 96.

I claim:

1. A mechanism for providing high load capabilities in downhole locations, comprising:
   tubulars, at least one of said tubulars being constructed from composite; and
   a thread form on said at least one of the tubulars; wherein said thread form comprises a consistent load bearing flank angle of 15° to 50° as measured from the axis of said tubular and said thread form comprises a clearance flank angle of 15° or less as measured perpendicular to the axis of said tubular.

2. The mechanism of claim 1, wherein there are at least two tubulars.

3. The mechanism of claim 1, wherein said tubular composite is to be used for downhole applications.

4. The mechanism of claim 1, wherein said tubular composite is constructed in a laminar fashion.

5. The mechanism of claim 4, wherein said laminar material is constructed by wrapping a reinforcing cloth.

6. The mechanism of claim 4, wherein said laminar material is constructed by wrapping by a reinforcing fabric.

7. The mechanism of claim 4, wherein said laminar material is constructed of winding a reinforcing tape.

8. The mechanism of claim 4, wherein said laminar material is constructed of winding a reinforcing filament.

9. The mechanism of claim 4, wherein said laminar material is constructed of reinforcing material and a resin matrix.

10. The mechanism of claim 1, wherein said thread form translates an axially directed force into a radially directed force.

11. The mechanism of claim 1, wherein at least one of said tubulars includes a thread pitch, said thread pitch having from 2 to 12 threads per inch.

12. The mechanism of claim 1, wherein at least one of said tubulars includes a thread pitch and a thread root and a crest, said root and crest being left sharp.

13. The mechanism of claim 1, wherein at least one of said tubulars includes a thread pitch and a thread root, said root being truncated.

14. The mechanism of claim 1, wherein at least one of said tubulars includes a thread pitch and a thread root, said root of the thread being radiused.

15. The mechanism of claim 1, wherein at least one of said tubulars includes a thread pitch and a thread crest, said crest of the thread being radiused.

16. The mechanism of claim 1, wherein said tubular has thread manufactured in a right hand orientation.

17. The mechanism of claim 1, wherein said tubular has thread manufactured in a left hand orientation.

18. The mechanism of claim 1, wherein said tubular has thread bound by an adhesive applied to said thread, whereby load capacity is enhanced.

19. The mechanism of claim 1, wherein said thread form shifts loading on said tubular from shear to compression.

20. The mechanism of claim 1, wherein said tubulars include male threads and mating female threads.

21. The mechanism of claim 1, wherein at least one of said tubulars includes a thread pitch and a thread root, said root being truncated.

22. A tubular mechanism, comprising:
   a tubular;
   a composite material weak in shear and good in compression;
   a thread, said thread mounted on said tubular; said thread being substantially made of said composite anisotropic material, nonuniform in loading and an isotropic tubular member, uniform in material strength, wherein said thread comprises a consistent load bearing flank angle of 15° to 50° as measured from the axis of said tubular and said thread form comprises a clearance flank angle of 15° or less as measured perpendicular to the axis of said tubular.

23. The tubular mechanism of claim 22, wherein said thread transfers loading on said tubular from shear to compression.

24. The tubular mechanism of claim 22, wherein said composite material comprises glass or carbon.

25. The mechanism of claim 22, wherein said composite material further comprises resin.

* * * * *